United States Patent [19]

Duriez

[11] Patent Number: 4,831,569

[45] Date of Patent: May 16, 1989

[54] DISPLAY SYSTEM FOR INDICATING STANDBY OPERATIONS OF ELECTRONIC DATA PROCESSING APPARATUS

[75] Inventor: Bruno Duriez, Cagnes/Mer, France

[73] Assignee: Texas Instruments Incorporated, Dallas, Tex.

[21] Appl. No.: 217,114

[22] Filed: Jul. 7, 1988

Related U.S. Application Data

[63] Continuation of Ser. No. 751,700, Jul. 3, 1985, abandoned.

[30] Foreign Application Priority Data

Jul. 23, 1984 [FR] France ................................ 84 11662

[51] Int. Cl.$^4$ ............................................ G06F 3/147
[52] U.S. Cl. ............................ 364/710.01; 364/709.06
[58] Field of Search .................................. 364/709, 710

[56] References Cited

U.S. PATENT DOCUMENTS

| | | | |
|---|---|---|---|
| 4,125,867 | 11/1978 | Cochran | 364/772 |
| 4,208,720 | 6/1980 | Harrison | 364/709 |
| 4,334,279 | 6/1982 | Miyakoshi et al. | 364/709 |
| 4,371,926 | 2/1983 | Yamaura et al. | 364/200 |
| 4,400,771 | 8/1983 | Suzuki et al. | 364/200 |
| 4,454,581 | 6/1984 | Nystrom | 364/200 |
| 4,580,235 | 4/1986 | Yanagawa | 364/710 |

*Primary Examiner*—Gary V. Harkcom
*Assistant Examiner*—Tan V. Mai

*Attorney, Agent, or Firm*—William E. Hiller; N. Rhys Merrett; Melvin Sharp

[57] ABSTRACT

A display system for visually indicating standby operations belonging to a set of hierarchal processing operations to be carried out by an eletronic data processing apparatus, such as an electronic computing machine, wherein the display system includes a plurality of operation data registers for temporarily storing certain standby operations of the set of hierarchal processing operations to be carried out by the electronic data processing apparatus. A microprocessor controller is operably associated with the operation data registers and determines the priority order of the processing operations which are to be represented by data as stored in the operation data registers the priority order being in accordance with a predetermined hierarchal rule. Thus, the data is arranged in the operation data registers in the order of priority of the standby operations represented thereby. The display system further includes a character memory in which codes for all of the characters and the binary designations to be displayed are stored, a display controller operably interconnected between the microprocessor and the character memory and a display which includes first and second regions for respectively displaying, by selective actuation of display segments, numerical digits representative of the mathematical computations and the standby operations which are awaiting execution, the actuation of the individual display segments for visual indication by the display being under the regulation of the display controller.

6 Claims, 2 Drawing Sheets

DISPLAY SYSTEM FOR INDICATING STANDBY OPERATIONS OF ELECTRONIC DATA PROCESSING APPARATUS

This application is a continuation of application Ser. No. 751,700 filed on July 3, 1985 now abandoned.

BACKGROUND OF THE INVENTION

This invention relates to computing machines and, more specifically, to scientific computers.

The scientific computers manufactured and sold by the applicant include an interesting characteristic called algebraic notation.

This method of data introduction allows for the utilization of parentheses to effect calculations in the same manner as they are written.

For example, to calculate the expression:

$$4+(5+9)/(8-4)$$

one would utilize, in such a computer, the following key sequence:

$$4+(5+9)\div(8-1)=$$

The various operations executed by the computer are grouped in a hierarchy having the following priorities:

$$\sqrt{Y}, \quad Y^X, X, /, +, -$$

This method requires the holding on standby of some operations and their operands.

In the above example, the first addition will not be really executed until the activation of the "=" key.

This method is very powerful and can effect the calculation of very complicated formulas.

The scientific computers available up until now, however, although they effect complex series of operations by respecting predetermined hierarchies, do not follow the evolution of the calculation in progress while monitoring it.

SUMMARY OF THE INVENTION

The invention eliminates this drawback in that the computer indicates to the user the calculations operations in progress and those which are on standby due to the nature of the calculation and the operation priority.

The invention has therefore as an object a standby operations indicating device, these standby operations belonging to a set of operations to be carried out by an electronic computing machine, characterized in that it includes means for storing in a temporary manner some operations of said set of operations to be carried out, means for determining the priority order, according to a defined rule, of the operations among those contained in said storage means, display control means, and means for displaying standby operations.

BRIEF DESCRIPTION OF THE DRAWINGS

The invention will be more fully described hereinafter in connection with the drawings.

In the drawings.

DESCRIPTION OF THE PREFERRED EMBODIMENT

Figure 1:
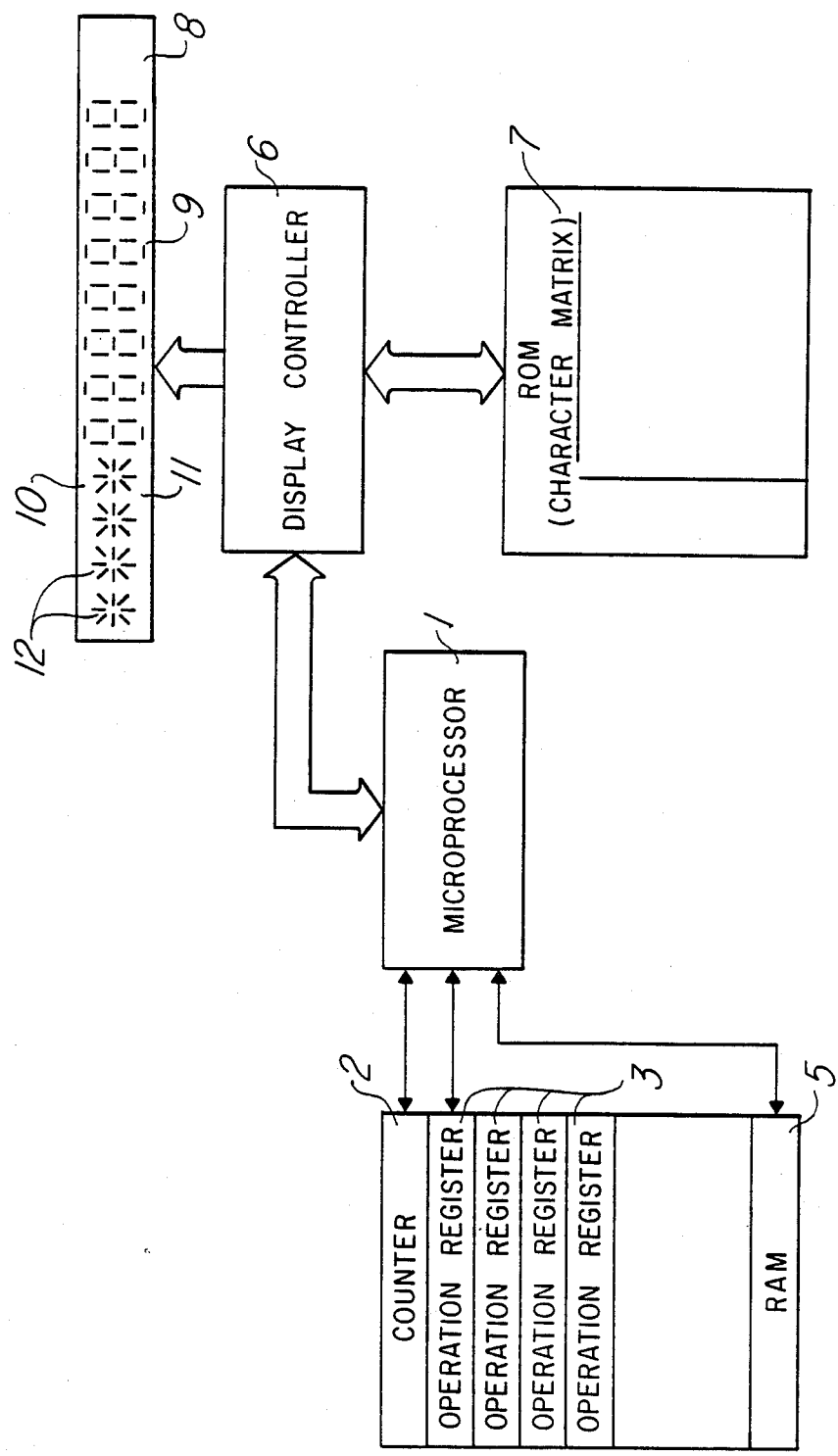
FIG. 1 is a schematic of a standby operations indicator according to the invention.

The device shown in FIG. 1 includes a microprocessor 1 which is the microprocessor in the computer which is equipped with the device according to the invention.

The microprocessor 1 is connected to counter 2 having a capacity N, as well as to operation registers 3 which form a part of the operation registers of the computer, and which contain the data relating to the stack of standby operations.

Registers 3 are of the "last in first out" type.

In this embodiment, there are four registers 3, this being the number corresponding to the number of standby operations allowed by the computer.

The microprocessor is connected to a random access memory 5 of "Y" registers, each register storing a number between 10 to the $-99$th and 10 to the $-100$th power or the code of an operation.

The microprocessor 1 is also connected to a display controller 6 located between a read only memory 7 having a character matrix and a display device 8.

The character matrix 7 contains the codes for all of the characters which can be displayed and the binary designation of each character.

The display device 8 includes a region 9 having eight display zones for the digits 0 to 9, each zone being formed of 7 segments for forming the digits and an eighth segment for forming a decimal point.

Another region 10 of the display device includes four zones 11 for forming the designations of the operations which can be held on standby.

Zones 11 each include 8 segments 12 arranged in a star form which displays the operations designations such as:

$$+,-,\times,/, \text{etc.}$$

The energization of the segments 12 is effected by display controller 6.

The functioning of the device which has been described will now be examined.

The microprocessor 1 has the following functions.
Transfer the data from one register to another,
Incrementation,
Communication with the display controller 6.

The data from microprocessor 1 are supplied to counter 2 and transferred to operation registers 3 according to their priority in the operations group with each individual operation being provided by a corresponding operation key of the machine's keyboard.

Then, in a known manner, the microprocessor controls the execution of the priority operations in the priority order indicated above, the other operations being held on standby until the turn. In the latter respect, it will be understood that the selectivity of the respective operation registers 3 by the microprocessor 1 may be accomplished in a suitable known manner, such as disclosed in U.S. Pat. No. 4,208,720 Harrison issued June 17, 1980 or in U.S. Pat. No. 4,125,867 Cochran issued Nov. 14, 1978, where the content of operation registers is manipulated in the performance of arithmetic operations under the control of a microprocessor system.

Simultaneously, the microprocessor 1 transmits the priority information of the standby operations in registers 3 to the display controller circuit which displays, to the left of the number formed by the number display registers 9, the standby operations in regions 11.

The display controller controls the display of the characters contained in character memory 7.

Figure 2:
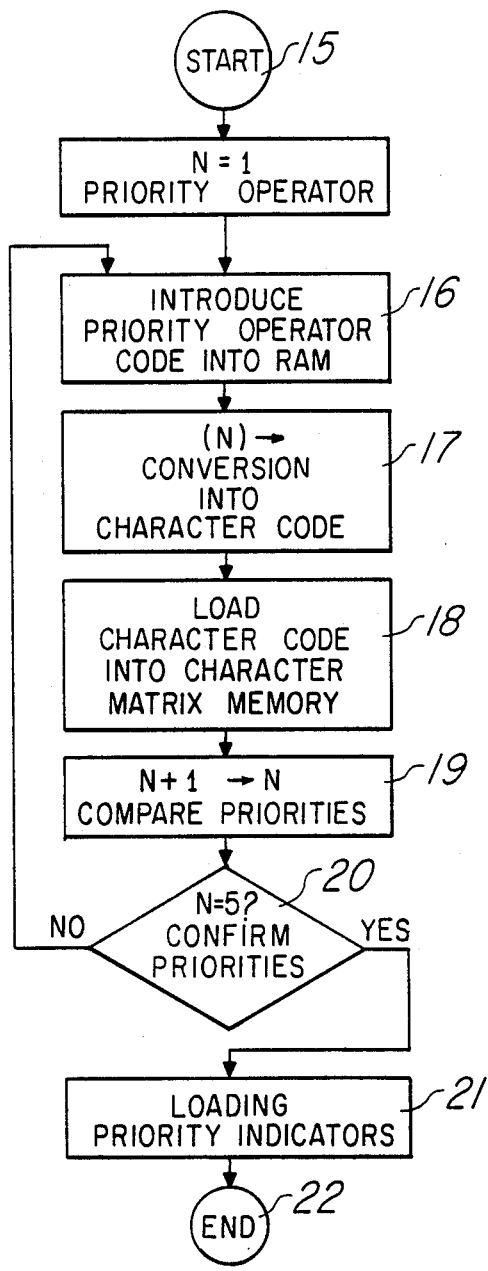
FIG. 2 is a flow chart illustrating the functioning of the indicator of FIG. 1.

In FIG. 2, there is presented, as an example, a simplified flow chart of the portion of the program which controls the priority indicators for displaying the standby operations.

The circle 15 indicates the start of a priority determination operation which commences at 16 by the introduction of a particular priority operator into random access memory 5.

The priority operator code is then converted at 17 into a character code for the address of the character under consideration in character matrix 7. The character code is then loaded at 18 into memory 7.

Then, the operation "N+1" is compared with the operation "N" at 19, and so forth until the four operations having the lowest priorities have been determined.

When this situation is confirmed at 20, there is caused, at 21, the loading of the indicators corresponding to the four standby operations in part 10 of the display device, and the end of the operation is indicated at 22.

A computer having a device according to the invention constitutes a powerful pedagogical tool which renders necessary a knowledge of the arithmetic notation rules and the visualization of their functioning.

What is claimed is:

1. A display system for visually indicating standby operations belonging to a set of hierarchal processing operations to be carried out by an electronic data processing apparatus, said display system comprising:

first memory means for receiving and storing data representative of priority operator codes indicative of hierarchal mathematical commands relating to the set of hierarchal processing operations to be carried out;

control means operably connected to said first memory means for determining the priority order of data stored in said first memory means representative of the hierarchal processing operations in accordance with a predetermined rule with respect to the sequence of the processing operations represented by the data;

second memory means operably connected to said control means for temporarily storing data representative of the hierarchal processing operations to be carried out by the electronic data processing apparatus;

said control means accessing data representative of priority operator codes from said first memory means and transferring said data in priority order to said second memory means;

display character memory means storing character codes and the binary designation of each character which can be displayed by the display system;

display controller means operably interposed between said control means and said display character memory means for accessing character codes from said display character memory means in response to commands from said control means;

display means having first and second display regions for visually indicating digits in said first display region representative of numbers included in a mathematical computation or the results of a mathematical computation and for visually indicating symbols in said second display region representative of standby operations in the set of hierarchal processing operations being carried out by the electronic data processing apparatus; and said display means being operably connected to said display controller means and responsive to the output therefrom for selectively actuating digits in said first display region and symbols in said second display region wherein at least one symbol in said second display region is selectively actuated to visually display a particular standby operation in the set of hierarchal processing operations being accomplished by the electronic data processing apparatus.

2. A display system as set forth in claim 1, wherein said second memory means for temporarily storing data representative of the hierarchal processing operations to be carried out by the electronic data processing apparatus comprising a plurality of operation data registers.

3. A display system as set forth in claim 2, wherein said plurality of operation data registers defining said second memory means are arranged in sequential priority order corresponding to the number of standby operations included in the set of hierarchal processing operations to be carried out, each of said operation data registers being of the last-in, first-out data type.

4. A display system as set forth in claim 3, further including counter means operably interposed between said control means and said plurality of operation data registers comprising said second memory means for incrementally transferring data from said control means to respective ones of said operation data registers in said sequential priority order reflecting the priority order of the data representative of standby operations included in the set of hierarchal processing operations in effect.

5. A display system as set forth in claim 1, wherein said control means for determining the priority order of data stored in said first memory means representative of the hierarchal processing operations comprises a microprocessor programmed with a predetermind hierarchy rule for establishing the priority order of data representative of the hierarchal processing operations.

6. A display system as set forth in claim 1, wherein said second display region of said display means includes a plurality of display zones, each of said display zones having eight actuatable display segments arranged in a star form; and said display controller means selectively actuating respective display segments in said display zones of said second display region in response to commands from said control means such that said at least one symbol is formed as a visual display of a particular standby operation by the selective actuation of display segments in one of said display zones included in said second display region.

* * * * *